United States Patent [19]

Erchoff

[11] 3,953,119

[45] Apr. 27, 1976

[54] SLIDE PROJECTOR AND INDEXING MECHANISM FOR ALTERNATE SLIDE TRAYS OF DIFFERENT CONFIGURATIONS

[75] Inventor: Jean-Paul Erchoff, Belsele, Belgium

[73] Assignee: GAF Corporation, New York, N.Y.

[22] Filed: Sept. 19, 1974

[21] Appl. No.: 507,477

Related U.S. Application Data

[63] Continuation-in-part of Ser. No. 376,181, July 3, 1973, abandoned.

[52] U.S. Cl.................................. 353/116; 353/117
[51] Int. Cl.[2].................... G03B 23/04; G03B 23/06
[58] Field of Search ........... 353/114, 116, 103, 117, 353/118

[56] References Cited
UNITED STATES PATENTS

| 2,711,602 | 6/1955 | Wikland | 353/92 |
|---|---|---|---|
| 3,704,943 | 12/1972 | Rube | 353/117 |
| 3,827,796 | 8/1974 | Erchoff | 353/116 |

FOREIGN PATENTS OR APPLICATIONS

| 1,408,255 | 7/1965 | France | 353/116 |
|---|---|---|---|
| 1,046,363 | 2/1957 | Germany | 353/116 |
| 2,146,048 | 2/1973 | France | |
| 2,147,173 | 3/1973 | Germany | |

*Primary Examiner*—Richard E. Aegerter
*Assistant Examiner*—Steven L. Stephan
*Attorney, Agent, or Firm*—Walter C. Kehm; Arthur Dresner

[57] ABSTRACT

A slide projector adapted to alternately receive at least two slide trays having different shapes and different indexing configurations is provided. The projector comprises a slide tray receiving groove having tray guide means for slidably engaging corresponding support surfaces formed on the slide trays, and a reversible slide tray indexing mechanism having an indexing lever mounted for slidable and pivotable movement and including a pair of pawls for sequential engagement with the respective indexing racks of the alternate trays, to incrementally advance either of said trays from one slide position to the next. A reciprocal slide carrier for transporting the slides from the trays to the viewing position is provided with a camway in operative engagement with the indexing lever to impart the required movement thereto during each slide changing cycle. The projector also includes slidable tray retainer means formed as a part of the tray guide means to support the edge of one of said trays to maintain the same in engagement with the indexing mechanism.

25 Claims, 13 Drawing Figures

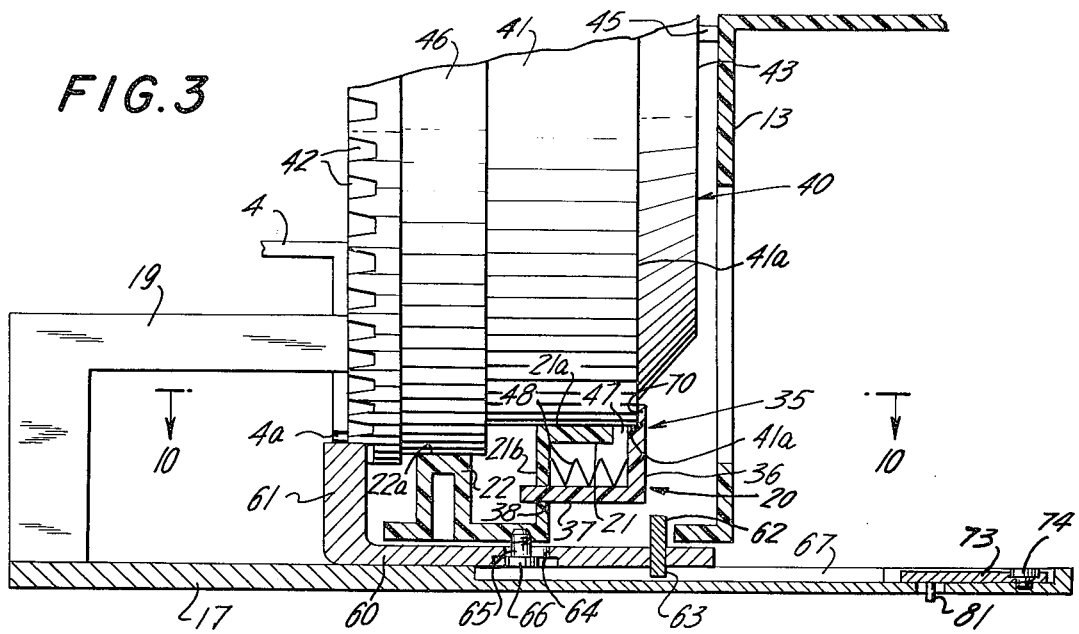
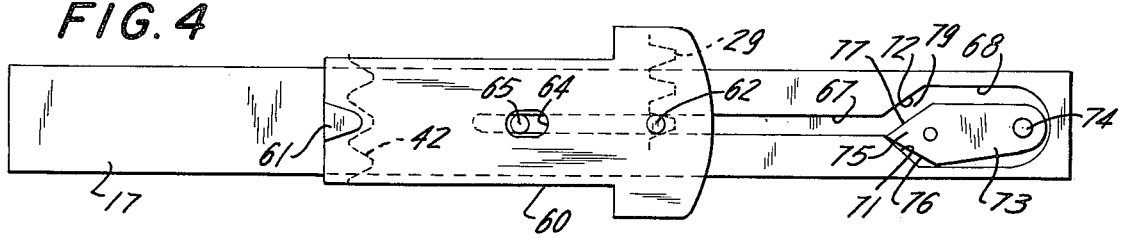
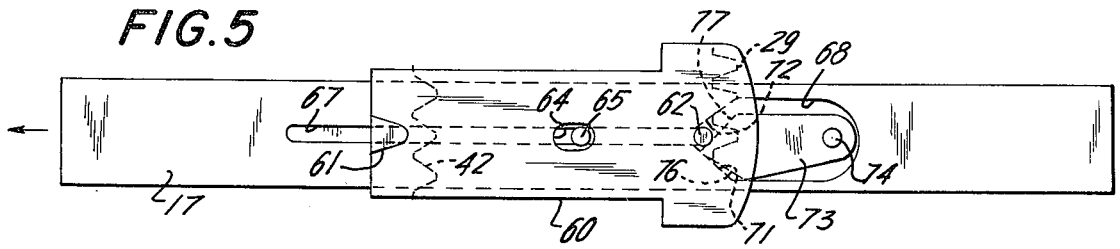
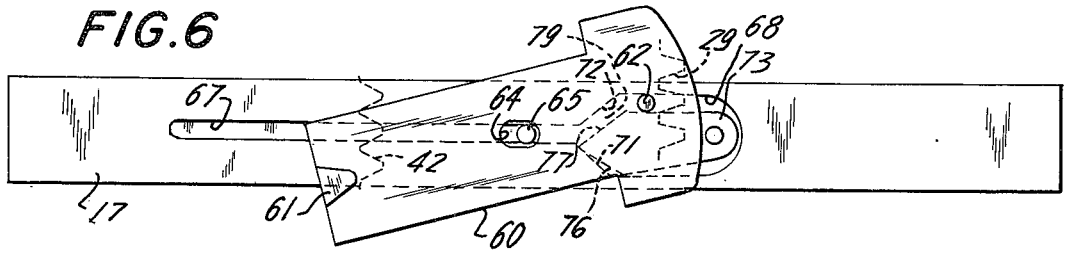
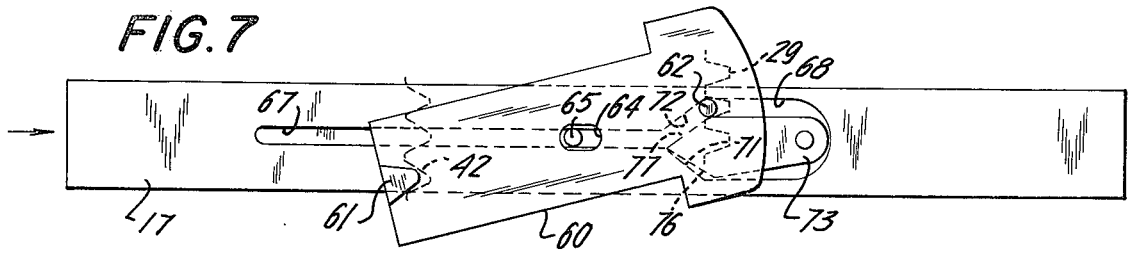

SLIDE PROJECTOR AND INDEXING MECHANISM FOR ALTERNATE SLIDE TRAYS OF DIFFERENT CONFIGURATIONS

BACKGROUND OF THE INVENTION

This application is a continuation-in-part of my copending application, Ser. No. 376,181, filed July 3, 1973 and now abandoned.

It is well known to provide slide projectors of the type having a tray receiving groove adapted to alternately receive slide trays of different configurations, and having means for indexing any such slide trays disposed in the groove from one slide position to the next, so that all of the slides in such tray may be sequentially advanced to the viewing position. In most instances, the alternate tray configurations consist of a horizontally disposed box type rectangular tray and a vertically disposed circular tray, the object being to increase the slide holding capacity by the use of the circular tray. Both such tray configurations are provided with a peripheral rack of teeth or other projections, each of which corresponds to a slide receiving space therein, and an indexing gear in the projector is adapted to operatively engage such teeth or projections on either tray to sequentially advance such tray from slide to slide. An example of a projector of this type is shown in U.S. Reissue Pat. No. Re 26,619 to Hall.

The Hall device, which is typical of projectors of this type, includes a single indexing drive gear adapted to engage the teeth of either a box tray or a circular tray. For support and guidance purposes the box type tray rests on the bottom surface of the tray receiving groove, and is held thereby in engagement with the indexing gear. In addition, a pair of spaced support lugs are provided on a side wall of the slide tray receiving groove to engage two points along the outer periphery of the circular tray, and a projection or guide surface formed on the opposite wall of the tray receiving groove holds the tray in contact with such projections. In this manner, the circular tray is properly positioned for engagement with the indexing gear. In some instances the lowermost point of the circular tray is also adapted to rest upon the bottom surface of the tray receiving groove for additional support. It should be noted that on most projectors of this type the pitch of the indexing racks formed on both the box tray and the circular tray are identical, so that the same incremental rotation of the indexing gear is adapted to advance either of said trays the appropriate distance.

Unfortunately, although the foregoing described projectors are in widespread use, they are generally acceptable for use only with slide trays manufactured specifically for a particular projector, and are incapable of use with alternate slide trays having different support and indexing configurations. Accordingly, if an individual has one or more slide trays produced by one manufacturer, such trays generally cannot be utilized in a slide projector produced by another manufacturer. In addition, in some instances circular trays and box type trays produced by the same manufacturer cannot be utilized in a single projector produced by the same manufacturer because each of such trays has different support and indexing requirements. To overcome this deficiency, some manufacturers have provided removable adaptors to be positioned within the tray receiving groove for supporting either the box tray or the circular tray. Such adaptors may also include a reduction gear network which provides a drive linkage between a main indexing gear, which is adapted to normally engage one of said trays, and the indexing rack of the alternate tray, so that each of said trays is advanced the appropriate distance from slide to slide.

An example of a removable adaptor for the purpose of accommodating a circular tray in a projector normally adapted for use with a box tray is disclosed in U.S. Pat. No. 3,572,921 to Mulch. The Mulch adaptor permits the alternate use of box trays and circular trays of different configurations within the same slide projector. However, the adaptor is quite inconvenient to use, costly to construct, and can in many instances cause jamming of one of the two slide trays if it is not properly installed. Furthermore, the Mulch device contemplates the use of a box tray and circular tray produced by the same manufacturer for use in a specified projector also produced by the same manufacturer.

In accordance with the disclosure of my copending application, Ser. No. 376,181, filed July 3, 1973, a slide projector adapted to alternately receive slide trays of different configurations was provided which overcomes many of the inconveniences and inefficiencies associated with prior devices of this type. Such projector incorporates a tray receiving groove having tray guide means formed therein for alternately supporting and guiding both circular and box type slide trays of completely diferent shapes and different indexing configurations without the need for a removable adaptor to support such trays, and also includes an indexing mechanism having suitable drive gears or pawls for engaging and incrementally advancing any of the trays installed within the tray receiving groove, and slidable tray retaining means to support the edge of one or more of the trays to hold the same in engagement with the corresponding drive gear.

In my prior U.S. Pat. No. 3,827,796 issued Aug. 6, 1974, the deficiencies and problems associated with gear type slide tray indexing mechanisms and their complex actuating brackets, and other components were enumerated and a slide tray indexing mechanism was provided to overcome the deficiencies found in such prior gear type indexing devices. The indexing mechanism disclosed in my said prior patent utilizes a pivotally and reciprocally movable lever arm having a pawl at one end thereof for engagement with the indexing projections of a slide tray, and is arranged such that it is in direct engagement with the slide carrier of the projector without the need for an intermediate actuating bracket.

SUMMARY OF THE INVENTION

In accordance with the present invention, an improved slide projector of the type adapted to alternately receive slide trays having different shapes and indexing configurations is provided which incorporates the most favorable features disclosed in my aforementioned copending application, as well as several additional features and improvements. The projector of the present invention utilizes a tray receiving groove having tray guide means formed therein for alternately supporting and guiding both circular and box type slide trays of completely different sizes, shapes and indexing configurations, and includes an indexing mechanism having a pivotally and reciprocally movable lever arm with a pawl at each end thereof for alternate engagement with the indexing projections of at least two different configuration slide trays to incrementally advance any of the trays installed in the tray receiving groove. Means are also provided to permit the indexing level to selectively advance the trays in either a forward or reverse direction. Additionally, one embodiment of the invention provides means for insuring positive engagement of one of said pawls with the indexing projections of one of said trays so as to avoid further transport of the tray during indexing which may occur as a result of inertia of the tray when it carries heavy slides or slide mounts, such as glass mounts.

In general, the slide projector of the invention comprises, in combination, a slide tray receiving groove for alternately holding a first slide tray having a supporting surface and a rack of indexing projections formed along one edge thereof, and a second slide tray having a supporting surface and a rack of indexing projections having a pitch different from the pitch of the indexing rack of said first slide tray; said tray receiving groove including tray guide means having a contoured surface corresponding to and adapted to slidably engage the supporting surfaces of the first and second trays; a slide carrier slidably disposed for reciprocating movement transversely to the tray receiving groove for transferring slides from either the first or second tray to the viewing position on the optical axis of the projector and returning the same to the slide tray; and an indexing mechanism for incrementally advancing either said first tray or said second tray within said tray receiving groove to sequentially present slides contained in said first or said second trays for viewing; said indexing mechanism including an indexing lever slidably mounted on the base of the slide projector for reciprocal movement transversely to the direction of movement of the slide trays and pivotal movement parallel to the direction of movement of the slide trays, and having a first pawl at one end for sequential engagement with the rack of indexing projections formed on the first slide tray, a second pawl at the other end for sequential engagement with the rack of indexing projections formed on the second tray, and an actuating member for imparting the required movement thereto; and a camway formed in the slide carrier in operative engagement with said actuating member for transversely moving said indexing lever to disengage the first and second pawls from the rack of indexing projections formed on the first and second trays, respectively, and pivotally moving said indexing lever to align the pawls with the next projection of said indexing racks upon withdrawal of the slide carrier from the projector, and for transversely moving said indexing level to engage said pawls with said next projection of the indexing racks and pivotally moving the lever to advance the slide trays to the next slide position by transporting the same through an extent corresponding to the distance between two adjacent projections on the indexing racks upon insertion of the slide carrier into the projector.

As an additional feature, the indexing lever is adapted for pivotal movement to effectuate either forward or reverse advancement of the slide tray. To accomplish such operation, a pivotal forward-reverse control means is provided in engagement with the actuating member of the indexing lever to selectively bias the same for a pivotal movement in the desired direction. In this regard, it should be noted that the pivot point of the indexing lever is at the approximate midpoint thereof between the first and second pawls, so that pivotal movement of the lever in one rotational direction will cause movement of one slide tray in the forward direction and the other slide tray in the reverse direction.

In addition, the preferred embodiment of the slide projector of the invention also includes tray retaining means formed as part of the tray guide means and slidably disposed for movement perpendicular to the direction of movement of the slide trays, between an inoperative position when the second tray is installed in the tray receiving groove and a retaining position within the tray receiving groove to support the edge of the first tray to maintain the indexing rack thereof in the proper position for engagement by the first pawl of the indexing lever. The retaining means is normally biased into the support position within the tray receiving groove, and includes camming means for engagement with the second tray to urge such retaining means into the inoperative position upon insertion of the second tray into the tray receiving groove. In this manner, the operator of the slide projector can readily change from one type of slide tray to another merely by removing the first from, and inserting the second into, the tray receiving groove. There is no necessity to install or remove additional support means or indexing means in order to accomodate any of the slide tray configurations with which the projector is adapted to be used.

The slide tray receiving groove is generally rectangular in shape and is defined by two side walls and a bottom wall extending substantially over the entire length of the projector in a position parallel to the optical axis thereof. The tray guide means is formed as an integral part of the bottom wall of the tray receiving groove and has a contoured surface of any desired configuration corresponding to the configuration of the slide trays adapted to be disposed within the tray receiving groove. For example, the guide means can include one or more upstanding projections or ribs adapted to engage corresponding grooves in the support surface of a particular slide tray, it can have one or more flat sections for engagement with corresponding slide tray surfaces, or can include one or more grooves for engagement with corresponding downwardly extending projections formed in any of the slide trays adapted to be installed in the slide projector. It should be noted that different portions of the contoured guide means surface can be adapted for engagement with different interchangeable slide trays.

The indexing lever is formed with a longitudinal slot and is mounted on the base of the projector beneath the slide tray receiving groove in longitudinal alignment with the slide carrier by means of a pin which slidably engages such slot. This type of arrangement permits pivotal movement of the lever and limited reciprocal travel thereof transversely to the direction of movement of the slide trays. The first and second pawls are preferably mounted on their respective ends of the indexing lever in longitudinal alignment with the mounting slot, and each extends upwardly through suitable openings formed in the base of the slide tray receiving groove in a position to engage the indexing racks of the first and second slide trays, respectively. The actuating member of the lever can be a downwardly extending portion of the second pawl or, alternately, a pin or tab mounted on the lever. In the latter case, it is preferable that the actuating member also be in longitudinal alignment with the second pawl and the mounting slot to simplify the pivotal and reciprocal travel requirements of the lever.

The camway formed in the slide carrier is preferably in the form of an elongated groove corresponding in width to the width or diameter of the actuating member to slidably receive the same, and extends longitudinally along the base portion of the slide carrier beneath the slide tray receiving groove of the projector. A section of the camway is disposed at an angle with respect to the elongated groove, so that the engagement of the angular section with the actuating member of the indexing lever effectuates pivotal movement of such lever. The angular section of the camway can be formed as a part of the elongated groove having the same width thereof, so that the relative movement between the slide carrier and the actuating member of the lever effectuates the desired pivotal movement during both the withdrawal and insertion strokes of the slide carrier. In the preferred embodiment, however, the angular portion of the camway is an enlarged section at one end of the elongated groove having a pair of symmetrical angular walls tapered toward the groove, which walls selectively engage the actuating member to effectuate pivotal movement of the lever only during the insertion stroke of the slide carrier. In this embodiment, pivotal movement of the lever during the withdrawal stroke is accomplished by the provision of the forward-reverse control means, which comprises a guide lever pivotally mounted on the slide carrier within the enlarged section of the camway. The guide lever has a triangular shaped end, the sides of which selectively cooperate with the angular walls of the camway to form additional angular slotted camways for the actuating member. The triangular sides of the guide lever selectively engage the actuating member to pivotally move the indexing lever to advance a slide tray to the next position upon withdrawal of the slide carrier.

The forward-reverse control means also includes a bracket disposed for slidable movement transversely to the slide carrier and adapted to engage the guide lever to selectively pivotally move the same into a first position for the forward advancement of the first tray and the reverse advancement of the second tray, wherein one triangular wall of the guide lever forms a camway with one angular wall of the enlarged camway section, and a second position for the reverse advancement of the first tray and the forward advancement of the second tray, wherein the other triangular wall of the guide lever forms a camway with the other angular wall of the enlarged camway section. The bracket can be controlled by an operating lever or knob connected thereto and disposed on the exterior of the projector for manual selection of the forward and reverse modes for each tray or by an electromagnetic solenoid device operated by a selector switch.

The slide carrier and the indexing lever cooperate with one another in a manner such that the slide trays can be advanced only after the previously viewed slide has been fully returned to its appropriate slide receiving space within its slide tray. This is accomplished by suitably positioning and tolerancing the angular sections of the camway and the guide lever in the base portion of the slide carrier with respect to the slide pusher arm thereof which transports the slides to the viewing position. In this regard it should also be noted that the first and second pawls are positioned the appropriate distance from the pivot point of the indexing lever to accommodate for variations in the pitch of the indexing racks on the first and second trays. In this manner, each pawl is pivotally moved through the proper arcuate extent to advance its corresponding tray from slide to slide.

To prevent unintentional movement of either slide tray when the slide carrier is fully withdrawn and the appropriate pawl on the indexing lever has disengaged the indexing teeth on its corresponding slide tray, a detent means in the form of a spring clip or a spring biased ball can be provided to engage the teeth of the indexing racks of each tray to maintain such trays in the selected position. The detent means, however, does not interfere with the movement of the trays when force is applied to it manually by the operator or by means of the indexing lever during normal reciprocating movement of the slide carrier. It has been found that when using trays which carry slides in heavy mounts (such as glass mounts) the additional weight and inertia of the tray may cause it to travel past a selected position during indexing transport overcoming the effect of the detent means. Thus a biased retainer plate is provided which carries means for engagement with the indexing lever to insure positive engagement of the pawls with the indexing projections of their respective slide trays.

The slide trays that can be operatively installed in the slide projector of the invention can vary greatly in configuration. By referring to first and second slide trays it should be noted that each of such designations can include more than one type of slide tray; provided, however, that the slide trays included within each designation comprise the same support and indexing configuration. For example, the first slide tray can be either a horizontally disposed box type tray or a vertically disposed circular tray, both having the same configuration indexing racks. Similarly, the second slide tray can also be a box tray or circular tray with the same indexing racks. Furthermore, additional slide trays having indexing and support configurations different from both the first and second trays can also be adapted for use in the slide projector of the invention. To accommodate such additional trays the tray guide means is provided with the necessary contoured support surface and one or more additional pawls are included as a part of the indexing lever disposed an appropriate distance from the pivot point to effectuate the necessary tray advancement.

The slidable tray retainer means is disposed within a suitable opening formed in one portion of the tray guide means. In the preferred embodiment, the retaining means comprises a bracket having an upstanding lip which is adapted to engage and support the edge of the first slide tray when the same is disposed within the tray receiving groove to hold same in a position, whereby the indexing rack of said tray may be operatively engaged by the first pawl on the indexing lever. A biasing member such as a helical compression spring is disposed within the retainer opening of the tray guide means in contact with the innermost end of the bracket to bias the same into the tray supporting position. The camming means formed on the retainer can be in the form of two angular cam surfaces disposed on the edges of the bracket adjacent below the support lip. The cam surfaces are adapted to be engaged by the leading edge of the second tray to push the retainer bracket into a nonsupporting position upon installation of the second tray into such groove. In the non-supporting position the upstanding lip of the bracket fits within a groove on the underside of the second tray so as not to interfere with its advancement in either the forward or reverse direction.

The foregoing and other features of the slide projector and indexing mechanism of the invention are more fully described with references to the annexed drawings.

BRIEF DESCRIPTION OF THE DRAWINGS

FIG. 3 is another partial cross-sectional view showing the same section as in FIG. 2, but including therein a circular slide tray;

FIGS. 4 through 7 are top plan views of the slide tray indexing mechanism of the invention illustrating various positions of the indexing lever;

DESCRIPTION OF THE PREFERRED EMBODIMENTS

Figure 1:
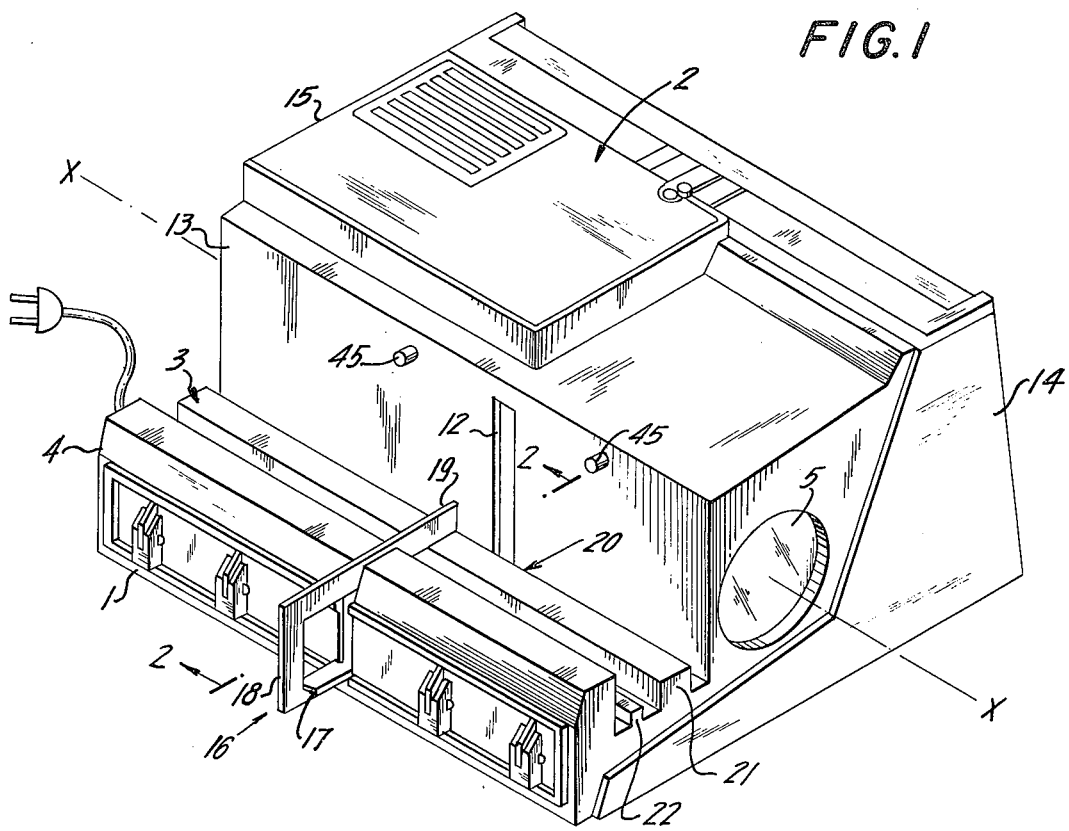
FIG. 1 is a perspective view of the slide projector of the invention.

Referring to FIG. 1, the slide projector of the present invention includes a base plate 1 and a projector housing 2 to fit thereon. The housing 2 is provided with a slide tray receiving groove 3 defined by walls 4 and 13, and which extends along one side thereof and is open at the top, front and rear ends, for alternately receiving several alternate interchangeable slide trays, as hereinafter described, in which a plurality of slides may be stored.

The optical axis of the projector is indicated by a broken line $x$—$x$ in FIG. 1, and as is well known in the art a lamp condenser lens (not shown) and focusing lenses 5 are disposed in the projector housing 2 in line with said optical axis. A vertically extending slide receiving aperture 12 is formed in vertical wall 13 of slide receiving groove 3 approximately midway between the front wall 14 and the rear wall 15 of the projector housing 2, to permit the transfer of slides from one of the interchangeable slide trays diposed in groove 3 to a viewing position in the projector and the return of the slides from the viewing position to the slide tray.

A slide carrier 16 is mounted for reciprocal sliding movement transversely of the optical axis $x$—$x$ and is adapted for transferring slides between a slide tray disposed in groove 3 and the viewing aperture 12 in the projector. The slide carrier 16 is characterized by an elongated base member 17 supported for sliding movement within the base plate 1 of the projector, a handle 18 which extends upwardly from the outer end of base member 17, a pusher arm 19 which extends inwardly from the upper end of the handle towards the optical axis $x$—$x$ of the projector in a parallel spaced arrangement above the base member 17, and by a vertically disposed plate member (not shown) which is secured by suitable fastening means to the opposite end of base number 17 for returning slides to a slide tray. Details of the slide carrier of the type embodied in the projector disclosed herein are more fully described in U.S. Pat. No. 3,183,774 to Kurz.

When the slide carrier is inserted inwardly from its outermost position, the innermost end of the pusher arm 19 engages a slide stored in the selected slide tray so as to transfer the same from such slide tray through the vertical slide aperture 12 to the viewing position in the projector on the optical axis. The slide is returned from its viewing position in the projector upon the outward withdrawal of the slide carrier 16 from its innermost position. After the slide carrier has returned the previously viewed slide to the slide tray, the slide tray is automatically advanced by the indexing means, which is hereinafter described, to present the next slide in the tray for viewing.

Figure 2:
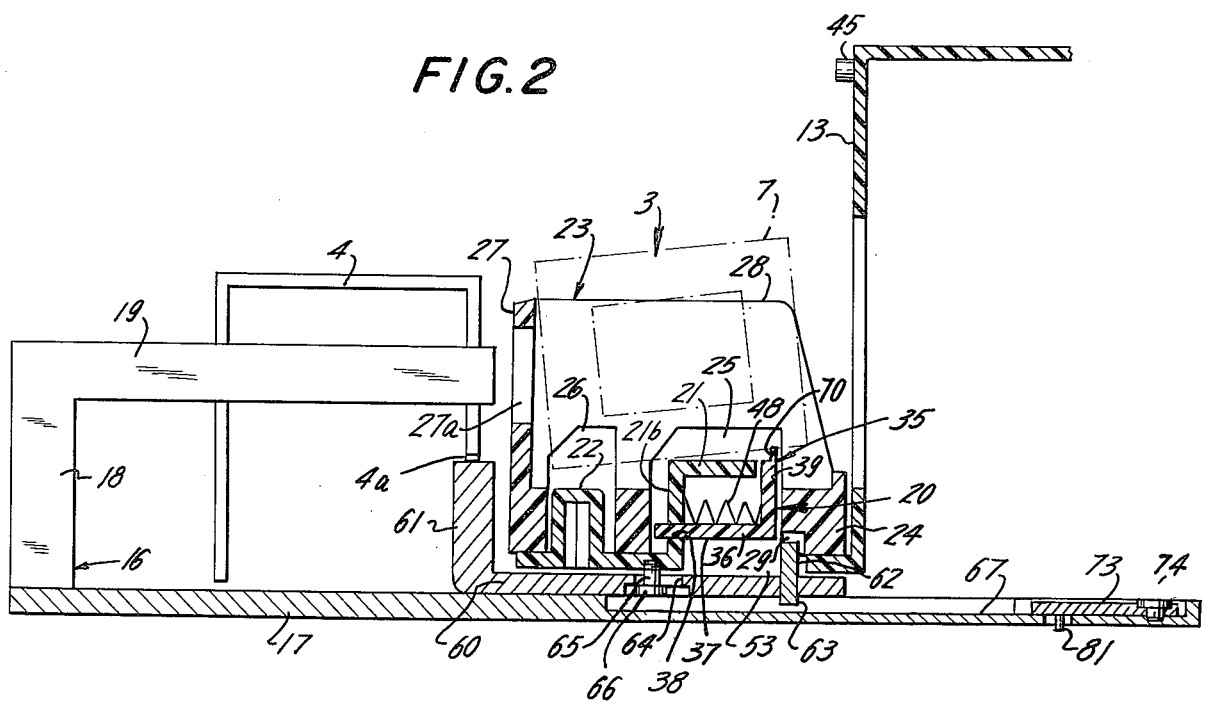
FIG. 2 is a partial cross-sectional view transverse to the optical axis of the projector taken along the lines 2—2 of FIG. 1 and including a box type slide tray disposed within the slide tray receiving groove.

As shown in FIGS. 1 and 2, a tray guide means 20 is disposed along the base of slide tray receiving groove 3. The tray guide means has a contoured surface which includes two upstanding elongated ribs 21 and 22, which ribs extend along the base of tray receiving groove 3. Ribs 21 and 22 are adapted to slidably engage corresponding grooves and/or support surfaces of the several different types of slide trays that can be alternately installed in the projector. A box type tray 23, which is disposed within slide tray receiving groove 3 of FIG. 2, comprises a lower wall 24 having a pair of elongated grooves 25 and 26 formed therein adapted to slidably engage ribs 21 and 22, respectively, a side wall 27 connected to lower wall 24, uniformly spaced from each other by a distance approximately equal to the thickness of a slide 7 disposed therein to define a plurality of slide receiving spaces, each being in alignment with a slot 27$a$ in wall 27 to permit entry of pusher arm 19 to transport slides from tray 23 to the viewing position. A rack of uniformly spaced indexing teeth 29 is formed in lower wall 24 extending along the peripheral edge of groove 25. Each tooth formed in rack 29 corresponds to a slide receiving space in tray 23.

FIG. 3 illustrates the same embodiment of the invention as shown in FIG. 2. However, in this instance a circular slide tray 40 is vertically disposed for rotational movement within tray receiving groove 3. Tray 40 comprises a first cylindrical outer surface 41 adapted to slidably engage the top surface 21$a$ of rib 21 formed in the tray guide means 20, and a second cylindrical outer surface 46 adapted to slidably engage the top surface 22$a$ of rib 22 formed in the tray guide means 20. In addition, tray 40 includes a plurality of radially disposed slide receiving spaced (not shown), and a rack of uniformly spaced indexing teeth 42 formed along the outer peripheral edge of cylindrical surface 41. Each of the teeth in rack 42 corresponds to a slide receiving space disposed within the tray and are adapted for engagement by the slide tray indexing means described hereinafter. It can be seen that the rack 42 of tray 40 is positioned on the opposite side of tray receiving groove 3 from rack 29 of tray 23, and accordingly, each such rack is adapted for engagement by a different portion of the indexing mechanism. Tray 40 also includes an annular bearing surface 43 formed on one side thereof. A pair of projections 45 extends from sidewall 13 from tray receiving groove 3 and is adapted to slidably engage annular surface 43. Cylindrical surface 41 also includes a stepped lip section 41$a$. Retainer assembly 35 is adapted to engage lip section 41$a$ to hold rack 42 in the proper position for engagement by the indexing mechanism. The combination of the retainer assembly 35, supporting surfaces 21a and 22a of guide means 20, and projections 45 served to support and rotatably guide slide tray 40 within tray receiving groove 3.

Figure 10:
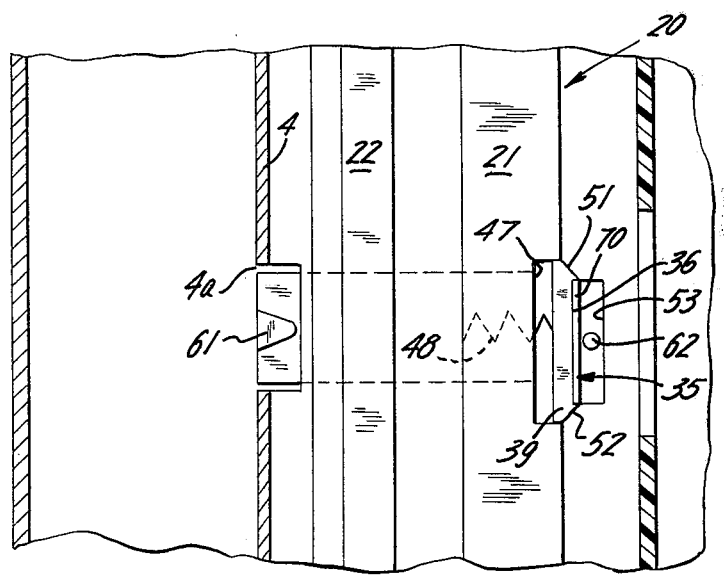
FIG. 10 is a partial cross-sectional view taken along the lines 10—10 of FIG. 3, showing the tray retainer means.

Referring now to FIGS. 2, 3 and 10 it can be seen that retainer assembly 35 comprises a generally L-shaped bracket 36 having a horizontal leg 37 slidably supported within an opening 38 of side wall 21b of rib 21, and a vertical leg 39 slidably disposed within a rectangular opening, 47 former in support surface 21a of rib 21. The upper end of vertical leg 39 includes an upstanding retaining lip 70 adapted to engage lip section 41a of tray 40 to slidably hold the same in the proper position. A helical compression spring 48 is disposed within rib 21 in engagement with the vertical leg 39 to bias bracket 36 into the tray retaining position within the tray receiving groove 3 as shown in FIG. 3. A pair of angularly disposed cam surfaces 51 and 52 are formed along the edges of vertical leg 39. The cam surfaces are adapted to be engaged by slide tray 23, shown in FIG. 2, and slide to automatically push bracket 36 into an inoperative position out of tray receiving groove 3 upon insertion of tray 23 into the tray receiving groove. It can be seen that in the inoperative position lip 70 is disposed within groove 25 of tray 23 and thereby does not interfere with the operation of such tray.

As noted above slide trays 23 and 40 are provided with peripheral rack of teeth 29 and 42, respectively, each of which corresponds to a slide receiving space in such trays. At the base of the tray receiving groove 3 an opening 53 is provided adjacent teeth 29 of tray 23 to permit operative engagement of such teeth by the indexing mechanism of the invention during each reciprocating stroke of the slide carrier 16. Similarly, an opening 49 is provided in wall 4 of the tray receiving groove 3 adjacent teeth 42 of alternate tray 40 to permit operative engagement of such teeth by the indexing mechanism during each stroke of slide carrier 16.

The indexing mechanism as shown in FIGS. 2–9 comprises an indexing lever 60 slidably mounted beneath the slide tray receiving groove 3 for reciprocal movement transversely to the direction of movement of the alternate slide trays 23 and 40 and pivotal movement parallel to the direction of movement of the said slide trays. The lever 60 has a first upstanding pawl 61 rigidly mounted at one end for sequential engagement with teeth 42 of slide tray 40, a second upstanding pawl 62 rigidly mounted at the other end for sequential engagement with teeth 29 of slide tray 23, and a downwardly extending actuating member 63 formed as a part of pawl 62, to implement the pivotal movement thereof. An axial slot 64 is formed at the approximate midpoint of the indexing lever 60, and a mounting pin 65 slidably extends through slot 64 and threadably engages the projector base 1 to secure the lever in place and permit pivotal movement and reciprocating movement thereof over the length of slot 64. Pin 65 has an enlarged head portion 66 which serves as a retaining disc to hold lever 60 in contact with base 1 of the projector beneath slide tray receiving groove 3.

The base member 17 of the slide carrier 16 has an integral camway 67 formed therein in operative engagement with the actuating member 63 of the indexing lever 60 for imparting the required pivotal and reciprocal movement thereto during the insertion and withdrawal strokes of the slide carrier. As shown in FIGS. 4 to 9, the camway 67 is in the form of an elongated slot corresponding in width to the diameter of actuating member 63 to slidably receive the same and thereby control the extent of pivotal movement of indexing lever 60. The camway 67 extends longitudinally along the base member of the slide carrier over a substantial length thereof and has an enlarged section 68 defined in part by symmetrical angular walls 71 and 72. A guide member 73 to control forward and reverse operation is pivotally mounted by means of pin 74, within enlarged section 68 and has a symmetrical triangular shaped leading section 75, the sides 76 and 77 of which selectively cooperate with angular walls 71 and 72, respectively, to define angular slotted camway 78 shown in FIG. 9 and angular slotted camway 79 shown in FIGS. 4 to 8. The slotted camways defined by enlarged section 68 and guide member 73 receive actuating pin 63 to impart pivotal movement to indexing lever 60 to transport pawl 61 over an arcuate extent corresponding to the distance between adjacent indexing teeth in rack 42 of tray 40 and pawl 62 over an arcuate extent corresponding to the distance between adjacent indexing teeth in rack 29 of tray 23 upon withdrawal of the slide carrier 16 from the projector. During the insertion stroke, angular camways 78 or 79 engage actuating pin 63 to pivotally move lever 60 in the opposite direction through the same arcuate to advance the alternate slide trays to the next slide position. It should be noted that mounting pin 65 also engages camway 67 to insure proper alignment between the indexing lever and the slide carrier.

It can be seen in FIGS. 4 to 7 that the pitch of indexing rack 29 on tray 23 is different than the pitch of rack 42 on tray 40. Accordingly, pawls 61 and 62 are disposed the appropriate distance from pin 65 so that each are transported over the necessary arcuate extent to effectuate advancement of such trays to the next slide position when either tray is installed in the tray receiving groove 3.

It should be noted that the position of enlarged section 68 of the camway 67 of the slide carrier and guide member 73 mounted therein with respect to the end of pusher arm 19 is such that pivotal movement of the indexing lever 60 is effectuated only after the previously viewed slide has been fully returned to the appropriate slide receiving space within slide tray 23 or 40 during withdrawal of the slide carrier. Similarly, the position of angular walls 71 and 72 of section 68 is such that lever 60 completes its pivotal movement to advance the selected slide tray to the next slide position prior to the engagement of the pusher arem 19 and a slide contained within the selected slide tray during insertion of the slide carrier.

It can also be seen that pivotal movement of indexing lever in one rotational direction causes pawls 61 and 62 to be transported in opposite linear directions. In this manner, for each selected position of guide member 73, tray 40 will be advanced in one direction when it is installed in tray receiving groove 3. To overcome this potential deficiency, guide member 73 is selectively pivotable into the position shown in FIGS. 4 to 8 and the position shown in FIG. 9 to engage the actuating pin 63 to selectively advance both alternate slide trays in both the forward and reverse directions.

Figure 8:
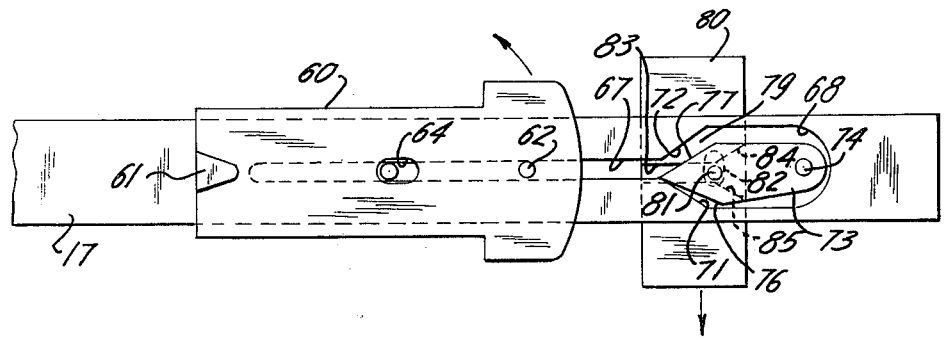
FIGS. 8 and 9 are top plan views of the slide tray indexing mechanism illustrating the forward-reverse control means in its two positions.
Figure 9:
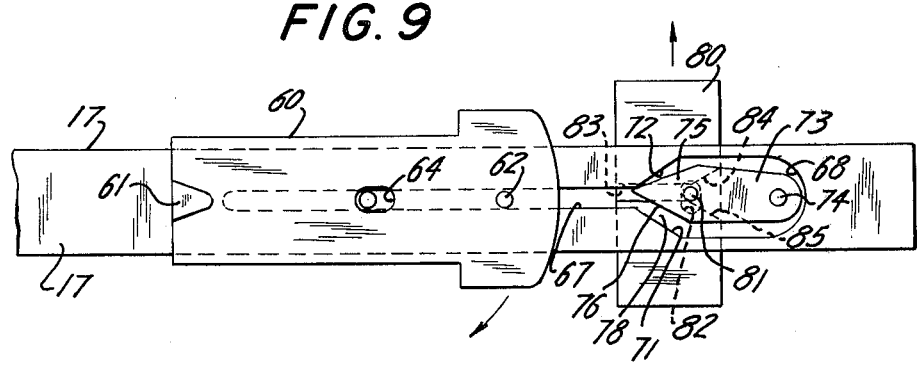

To accomplish such selective pivotal movement of guide member 73, a forward-reverse control bracket 80, shown in FIGS. 8 and 9, is provided. A downwardly extending pin 81 is mounted near the front of guide member 73 and extends through a transverse slotted opening 82 formed in the base member 17 of the slide carrier. The control bracket 80 is slidably disposed beneath base member 17 of the slide carrier for reciprocal movement in a plane substantially perpendicular thereto to selectively move the guide member 73 into position for either forward or reverse operation. The control bracket is formed with a longitudinal central slot 83 having two entrance cam sections 84 and 85 symmetrically disposed about said slot. Downwardly extending pin 81 mounted on guide member 73 is adapted to selectively engage either cam 84 or 85 to pivotally move the guide member into the desired position to define an angular camway for forward or reverse operation of both trays. When the control bracket 80 is in the position shown in FIG. 8, withdrawal of the slide carrier 16 causes pin 81 to engage cam section 84, thereby pivotally moving guide member 73 into a first operating position, in which the indexing lever 60 is pivotally moved in the manner described hereinafter with respect to FIGS. 3 to 7. When the control bracket 80 is moved into the position shown in FIG. 9 cam section 85 engages pin 81 to pivotally move guide member 73 into the opposite position to effectuate advancement of the slide trays in the opposite direction. The control bracket 80 can be connected by suitable linking means to an electromagnetic solenoid or to a mechanical linkage accessible from the exterior of the projector to permit the operator to manually select the desired mode of operation.

In operation, to install the desired interchangeable slide tray within the tray receiving groove, slide carrier 16 is first withdrawn from the projector to provide access to tray receiving groove 3 and the desired tray is inserted therein. In the case of tray 40 retainer assembly 35 is biased into a supporting position within the tray receiving groove to support the edge of such tray to position the same for engagement of indexing rack 42 by pawl 61 of indexing lever 60. In the case of slide tray 23, the engagement of the edge of such tray with camming surfaces 51 and 52 urges retainer assembly 35 into an inoperative position out of the tray receiving groove. Once the desired tray has been installed within the projector, normal operation can then be commenced. The reciprocating movement of slide carrier 16 advances slides to and from the selected slide tray and also causes incremental advancement of such tray to the next slide position.

Once the selected tray is installed within the projector the operation of the indexing mechanism is remarkably simple and is illustrated in FIGS. 4 to 7. FIG. 4 shows the slide carrier 16 fully inserted in the slide projector and the indexing lever 60 positioned with either pawl 62 in engagement with the teeth 29 of slide tray 23 or pawl 61 in engagement with the teeth 42 of tray 40. Upon the initial withdrawal of the slide carrier, lever 60 is carried therewith the distance of axial slot 64 formed therein. By dimensioning the actuating member 63 for a close fit within the camway 67 the frictional forces therebetween are sufficient to overcome the holding force of pin 65 within slot 64 so that the indexing lever 60 will move in the manner described above. In this position, which is shown in FIG. 5, the indexing pawl 61 will be out of engagement with the rack 42 of indexing teeth formed on slide tray 40 and the pawl 62 will be out of engagement with teeth 29 formed on tray 23. In the fully withdrawn position of the slide carrier, as shown in FIG. 6, the actuating member 63 engages angular camway 79 defined by angular wall 72 of enlarged section 68 and wall 77 of guide member 73 to pivotally move the lever into the position shown. As the slide carrier 16 is again inserted into the slide projector, lever 60 is inwardly advanced the distance of slot 64, to enable pawl 62 to engage the next tooth in the slide tray indexing rack 29 of tray 23, and alternatively to enable pawl 61 to engage the next tooth of indexing rack 42 of tray 40. Further inward movement of the slide carrier, places the angular camway 79 in engagement with the actuating member 63 to pivotally move lever 60 to the starting position shown in FIG. 4, thus causing pawl 61 to advance slide tray 40 to the next slide space, or pawl 62 to advance slide tray 23 to the next slide space, depending upon which tray is installed in the projector.

It will be apparent to those skilled in the art that when guide member 73 is moved by control bracket 80 to the position shown in FIG. 9, angular camway 78 defined by angular wall 71 of the enlarged section 68 and wall 76 of guide member 73 will engage actuating member 63 to pivotally move lever 60 in the opposite direction to effectuate corresponding advancement of either slide tray in the opposite direction.

Figure 11:
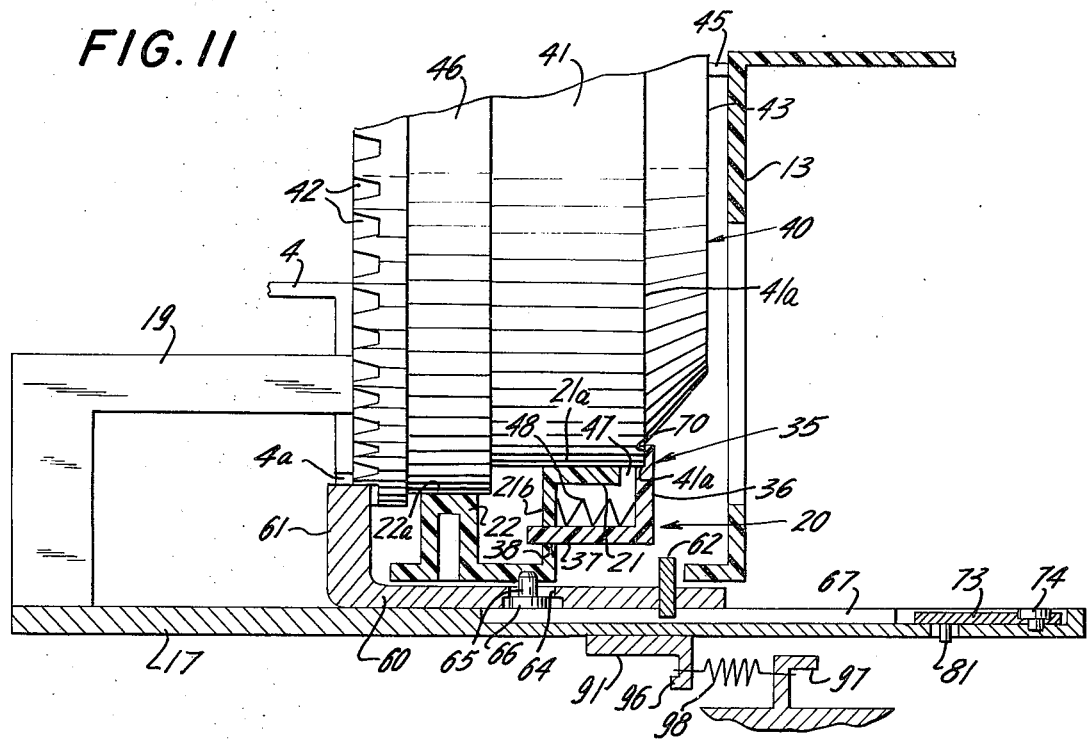
FIG. 11 is a partial cross-sectional view similar to that of FIG. 3 and including the retainer plate.
Figure 12:
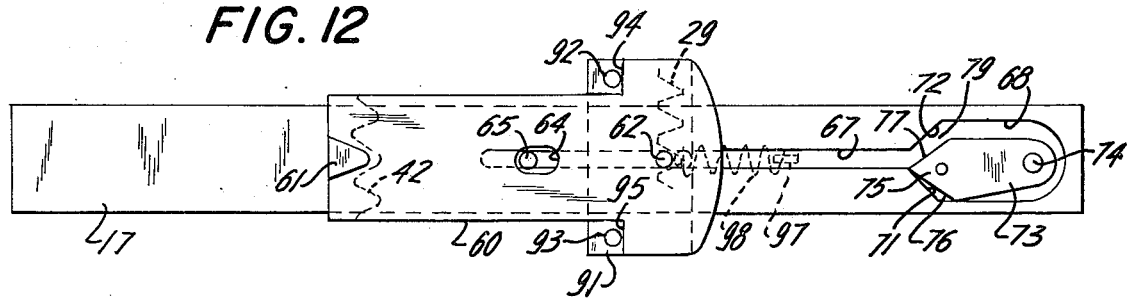
FIGS. 12 and 13 are top plan views simiilar to those of FIGS. 4 and 6 respectively, showing different positions of the indexing lever and retainer plate.
Figure 13:
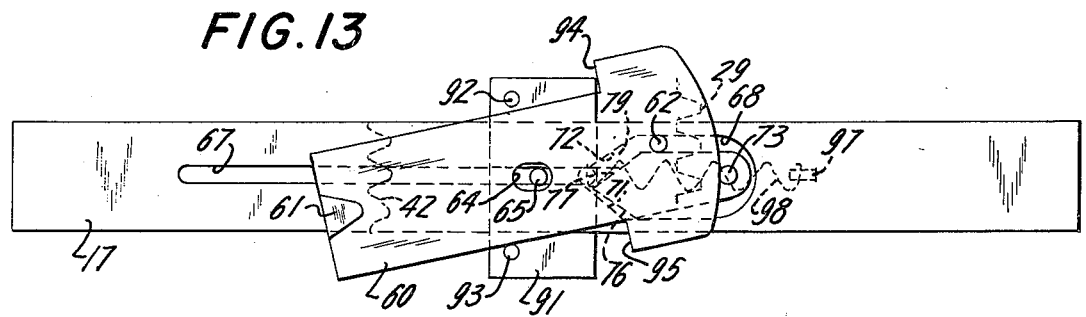

As an additional feature, the projector as contemplated in connection with the present invention may include means for causing the pawls of indexing lever 60 to positively engage the indexing projections of their respective slide trays 23 or 40. With reference to FIGS. 11, 12 and 13, such means are accomplished by providing a retainer plate 91 positioned for sliding movement beneath base member 17. The retainer plate 91 carries upstanding pins or projections 92 and 93 for engagement with shoulders 94 and 95 respectively of indexing lever 60. A spring 98, connected at one end thereof to a hook element 96 of plate 91 and at the other end thereof to a hook element 97 of the projector housing, is biased in a direction (to the right in the drawings) for urging the pawls of lever 60 into engagement with the indexing projections of the slide trays when pins 92 and 93 engage shoulders 94 and 95 respectively of lever 60. When the base member 17 is moved to the position for slide insertion into the viewing aperture 12, the retainer plate 91 will be in the position shown in FIG. 12 so that the pins 92 and 93 engage shoulders 94 and 95 and, as a result of biasing spring 98, urge pawls 61 or 62 into positive engagement with projections 42 or 29 respectively. Movement of base member 17 in the opposite direction will cause retainer plate 91 to move to a position such that pins 92 and 93 do not engage the shoulders of lever 60 so that the lever is free to pivot as shown in FIG. 13. Movement of retainer plate 91 may be conveniently accomplished by engagement with pin 81 beneath base member 17. The use of such retainer plate arrangement has been found to be of advantage to produce positive engagement of the pawls into the appropriate indexing projections so as to prevent possible overtravel of the tray during indexing transport as a result of inertia forces of the tray in cases when the tray carries a heavy load, such as glass mounted slides.

The embodiments described hereinabove are included for illustrative purposes only and are in no way intended to limit the scope of the invention. Additional modifications of the instant projector and the indexing mechanism to accommodate additional slide trays having other configurations, which fall within the scope of this invention will be apparent to those skilled in the art.

What is claimed is:

1. In a slide projector of the type including a slide tray receiving groove formed by first and second side walls for holding a slide tray having a plurality of spaced apart slide receiving spaces, and a slide carrier slidably disposed for reciprocating movement transversely to the slide tray receiving groove for transferring a slide from a slide tray installed therein to the viewing position on the optical axis of the projector and returning the same to the slide tray, the improvement comprising means for alternately and selectively receiving within the slide tray receiving groove at least two slide trays having different shapes and racks of indexing projections of different configurations, a first one of said slide trays having its rack of indexing projections located closer to said first side wall of said groove than to the second side wall thereof, a second of said slide trays having its rack of indexing projections located closer to the second wall of said groove, said receivng means including tray guide means fixedly disposed within the slide tray receiving groove and having a contoured surface corresponding to and adapted to slidably engage, support and guide either of the alternate slide trays; and an indexing mechanism for incrementally advancing either of said alternate slide trays disposed within the slide tray receiving groove to sequentially present slides contained in either of said slide trays for viewing; said indexing mechanism including an indexing lever slidably and pivotally mounted on the projector adjacent said tray receiving groove, a first pawl carried on said lever at one end thereof adapted for incremental engagement with the indexing rack of the first slide tray, and a second pawl carried on said lever at the other end therof adapted for incremental engagement with the indexing rack of the second tray; an actuating member attached to the indexing lever for imparting the required movement to said indexing lever; and a camway formed in the slide carrier in operative engagement with said actuating member for longitudinally moving the indexing lever to disengage the first and second pawls from the indexing racks of the first and second slide trays respectively and pivotally moving said lever to align the pawls with the next projection of the respective indexing racks upon withdrawal of the slide carrier from the projector, and for longitudinally moving said indexing lever to engage the pawls with the next indexing projections on the slide trays and pivotally moving said lever through an arcuate extent corresponding to the distance between two adjacent projections on the racks of each tray to advance the selected slide tray to the next slide position upon insertion of the slide carrier into the projector.

2. A slide projector in accordance with claim 1, further comprising tray retaining means slidably disposed for movement perpendicular to the direction of movement of the alternate slide trays between an inoperative position when the second tray is installed in the tray receiving groove, and a retaining position to support the edge of one of the first trays when it is installed in the tray receiving groove, to maintain the indexing rack thereof in position for engagement by the first pawl; said retaining means being normally biased into the support position within the tray receiving groove, and including camming means for engagement with the second tray to urge such retaining means into the inoperative position upon insertion of said second tray into the slide tray receiving groove.

3. A slide projector in accordance with claim 2, in which the retaining means comprises a bracket having an upstanding lip which is adapted to engage and support one edge of the first slide tray disposed within the slide tray receiving groove.

4. A slide projector in accordance with claim 3, in which the camming means formed on the reeaining means is in the form of two angular cam surfaces formed on the edge of the bracket, which surfaces are adapted to be engaged by the leading edge of said second slide tray to push the bracket out of the tray receiving groove upon installation thereof.

5. A slide projector in accordance with claim 1, in which the first slide tray has a smooth supporting surface and a rack of indexing projections disposed along one peripheral edge thereof and the second slide tray has a supporting surface with at least one guide groove formed therein and a rack of indexing projections disposed along the inner edge of said groove having a pitch different from the pitch of the indexing rack of said first slide tray in which said tray guide means comprises at least one upstanding projection adapted to slidably engage the guide groove formed in said second tray, and a flat supporting surface disposed along the tope of said projection to engage the supporting surface of said first tray.

6. A slide projector in accordance with claim 5, in which the first slide tray has a circular configuration and is adapted to be vertically disposed within the slide tray receiving groove.

7. A slide projector in accordance with claim 5, in which the second slide tray has a box-type configuration and is adapted to be horizontally disposed within the slide tray receiving groove.

8. An indexing mechanism in accordance with claim 1, in which the indexing lever is selectively pivotable in a first rotational direction to effectuate forward advancement of the first slide tray and reverse advancement of the second slide tray, and a second direction to effectuate reverse advancement of the first slide tray and forward advancement of the second slide tray, and in which a forward-reverse control means is provided in operative engagement with said indexing lever to selectively bias the same for pivotal movement in either the first or the second direction.

9. An indexing mechanism in accordance with claim 8, in which the camway comprises an elongated slot extending longitudinally along a base member of the slide carrier beneath the slide tray receiving groove and having two symmetrical angular sections corresponding to the first and second directions formed therein; and said forward-reverse control means is adapted to bias the indexing lever in a manner such that the actuating member engages one or the other of said symmetrical angular sections during reciprocating movement of the slide carrier for pivotal movement in either the first or second directions to effectuate forward or reverse advancement of the selected slide tray, respectively.

10. An indexing mechanism in accordance with claim 9, in which the forward-reverse control means comprises a guide member pivotally mounted on the base member of the slide carrier adjacent the symmetrical angular sections having a triangular shape leading section the sides of which selectively cooperate with said symmetrical angular walls to form angular slotted camways for the actuating member; one such slotted camway being for forward operation and the other being for reverse operation; and a control bracket slidably disposed beneath the base member of the slide carrier for reciprocal movement in a plane substantially perpendicular thereto to selectively move the guide member into position for either forward or reverse operation.

11. An indexing mechanism according to claim 1, in which the indexing lever is formed with an axial slot at a midpoint thereof between the first and second pawls and is mounted on the base of the slide projector beneath the slide tray receiving groove by means of a pin which slidably engages such slot.

12. An indexing mechanism according to claim 11, in which the longitudinal slot is disposed in axial alignment with the pawls.

13. An indexing mechanism according to claim 1, in which the indexing lever is mounted above the base member of the slide carrier.

14. An indexing mechanism according to claim 13, in which the actuating member of the lever is a downwardly extending projection fixably disposed on the indexing lever in alignment with the second pawl.

15. An indexing mechanism in accordance with claim 1, in which the camway is formed as an integral part of a base member of the slide carrier slidably disposed beneath the slide tray receiving groove.

16. An indexing mechanism according to claim 15, in which the camway comprises an elongated slot extending longitudinally along said base member of the slide carrier and has at least one section thereof disposed at an angle with respect to the longitudinal axis of the slide carrier, so that engagement of the angular section by the actuating member of the indexing lever during reciprocating movement of the slide carrier effectuates pivotal movement of such lever.

17. An indexing mechanism according to claim 1, in which the slide carrier, the camway and the indexing lever are dimensioned to cooperate with one another in a manner such that the selected slide tray is advanced to the next position only after the previously viewed slide is fully returned to its appropriate slide receiving space within such slide tray. slotted camways for the actuating member; one such slotted camway being for forward operation and the other being for reverse operation; and a control bracket slidably disposed beneath the base member of the slide carrier for reciprocal movement in a plane substantially perpendicular thereto to selectively move the guide member into position for either forward or reverse operation.

18. An indexing mechanism according to claim 1, further comprising means for selectively engaging said indexing lever to bias said lever in a direction for causing said first and second pawls to engage the indexing rack of said first and second trays respectively when said trays are indexed to a selected position.

19. An indexing mechanism according to claim 18, wherein said selective engaging means comprises a retainer plate mounted for sliding movement in spaced parallel relationship to said indexing lever, projection means mounted on said retainer plate adapted for engagement with shoulder means on said lever, spring means connected at one end thereof to said retainer plate and at the other end thereof to the projector housing so as to bias said plate and said lever when engaged by said projection means in a direction for pawl and rack engagement, and means for moving said plate in an opposite direction to disengage said projection means and said shoulder means to allow said pivotal movement of said lever.

20. A slide projector adapted to alternately and selectively receive each one of a plurality of slide trays of the type having a series of spaced apart slide receiving spaces formed therein and a rack of indexing projections formed along a periphery thereof, in which each of such alternate trays have a different shape and a different indexing configuration, comprising, in combination, a slide tray receiving groove defined by first and second spaced paralleled side walls extending in a direction parallel to the projector optical axis for alternately holding each of said slide trays, the indexing projections of one of said slide trays when inserted in said groove being located adjacent one of said side walls, the indexing projections of another of said slide trays when inserted in said groove being located adjacent the other of said side walls, said groove including tray guide means for slidably engaging, supporting and guiding each one of the plurality of alternate slide trays; and a reversible indexing mechanism for incrementally advancing the selected slide tray having an indexing lever mounted on the base of the projector adjacent said tray for reciprocal movement transverse to the direction of movement of said trays and selective pivotal movement parallel to the direction of movement of said trays in either a first direction corresponding to forward advancement of the selected slide tray or a second direction corresponding to reverse advancement of the selected slide tray; a plurality of pawls each fixedly disposed on the lever for respective engagement with the indexing projections of said plurality of slide trays; one of said pawls being located on said lever for cooperation with the indexing projections adjacent one side wall, another of said pawls located on said lever for cooperation with the indexing projections adjacent the other side of said groove; a slide carrier slidably disposed for reciprocating movement transverse to the slide trays for transferring slides from the selected tray to the viewing position in the projector upon insertion thereof, and returning the same to the slide trays upon withdrawal thereof; said slide carrier having a base member disposed adjacent said indexing lever, and a camway formed in said base member in operative engagement with said indexing lever for longitudinally moving the indexing lever to disengage the pawls from the indexing projection of the trays and pivotally moving the lever to align the pawls with the next indexing projection on the trays upon withdrawal of the slide carrier, and for longitudinally moving said indexing lever to engage the pawls with said next projection of the trays and pivotally moving said lever through an arcuate extent corresponding to the distance between two adjacent projections to advance the slide tray upon insertion of the slide carrier; and a forward-reverse control means in operative engagement with said indexing lever to selectively bias the same for pivotal movement in either the first or second direction.

21. An indexing mechanism according to claim 20, in which the camway comprises an elongated slot extending longitudinally along the base member of the slide carrier and having two symmetrical angular sections corresponding to the first and second directions of pivotal movement of the indexing lever; and said forward-reverse control means comprises a slidable bracket adapted to engage the indexing lever to bias the same into operative engagement with one or the other of said angular sections during reciprocating movement of the slide carrier to effectuate pivotal movement in either the first or second directions.

22. A slide projector in accordance with claim 20, further comprising tray retaining means slidably disposed within the tray guide means for movement between an inoperative position, and a retaining position to support the edge of at least one of the plurality of alternate slide trays to maintain the indexing rack thereof in alignment for engagement with the corresponding pawl of the indexing mechanism.

23. A slide projector in accordance with claim 22, in which said retaining means is normally biased into the support position, and includes camming means for engagement with at least one other of said plurality of slide trays to urge said retaining means into the inoperative position upon insertion of said other tray into the tray receiving groove.

24. A slide projector in accordance with claim 20, in which the tray guide means is formed as an integral part of the tray receiving groove and has at least one upstanding projection adapted to slidably engage a corresponding groove and/or support surface of one or more of the plurality of alternate slide trays, and has one or more flat sections formed along the top of said projection for engagement with corresponding surfaces of one or more others of the plurality of alternate slide trays.

25. A slide projector in accordance with claim 20, in which the tray guide means is formed as an integral part of the tray receiving groove and includes one or more grooves for engagement with corresponding downwardly extending projections formed in one or more of the plurality of slide trays adapted to be alternately installed in the slide tray receiving groove.

* * * * *

UNITED STATES PATENT OFFICE
CERTIFICATE OF CORRECTION

Patent No. 3,953,119          Dated April 27, 1976

Inventor(s) Jean-Paul Erchoff

It is certified that error appears in the above-identified patent and that said Letters Patent are hereby corrected as shown below:

Column 4, line 24, change "accomodate" to "accommodate";
Column 7, line 27, change "simiilar" to "similar";
Column 8, line 50, change "spaced" to "spaces";
Column 9, line 10, change "former" to "formed";
Column 10, line 50, change "arem" to "arm";
Column 13, line 19, change "receivng" to "receiving";
Column 14, line 5, change "reeaining" to "retaining";
Column 14, line 23, change "tope" to "top";
Column 15, lines 39 through 46, delete "slotted camways for the actuating member;...................................
forward or reverse operation."

Signed and Sealed this

[SEAL]          Fourteenth Day of September 1976

Attest:

RUTH C. MASON
*Attesting Officer*

C. MARSHALL DANN
*Commissioner of Patents and Trademarks*